R. RÜDENBERG.
MEANS FOR PROTECTING ELECTRIC CIRCUITS FROM EXCESSIVE RISES IN PRESSURE AND SIMILAR DISTURBANCES.
APPLICATION FILED JULY 16, 1913.

1,077,163.

Patented Oct. 28, 1913.

Witnesses:
Elsie Swenson
H. Alfred Jauke

Inventor:
Reinhold Rüdenberg
by
Attorneys

UNITED STATES PATENT OFFICE.

REINHOLD RÜDENBERG, OF CHARLOTTENBURG, GERMANY, ASSIGNOR TO SIEMENS-SCHUCKERTWERKE, G. M. B. H., OF BERLIN, GERMANY, A CORPORATION OF GERMANY.

MEANS FOR PROTECTING ELECTRIC CIRCUITS FROM EXCESSIVE RISES IN PRESSURE AND SIMILAR DISTURBANCES.

1,077,163.  Specification of Letters Patent.  Patented Oct. 28, 1913.

Original application filed March 14, 1913, Serial No. 754,314. Divided and this application filed July 16, 1913. Serial No. 779,370.

*To all whom it may concern:*

Be it known that I, REINHOLD RÜDENBERG, a subject of the German Emperor, and a resident of Charlottenburg, near Berlin, Germany, have invented certain new and useful Improvements in Means for Protecting Electric Circuits from Excessive Rises in Pressure and Similar Disturbances, of which the following is a specification.

This is a division of my application Serial No. 754,314, filed March 14, 1913.

My invention relates to apparatus for protecting electric circuits from excessive rises in pressure and similar disturbances.

It refers in particular to an arrangement also shown and described in a copending application, Ser. No. 754,314, filed March 14th, 1913, from which the present application has been divided.

My invention will be more fully understood by reference to the accompanying drawing, of which—

Figure 1:
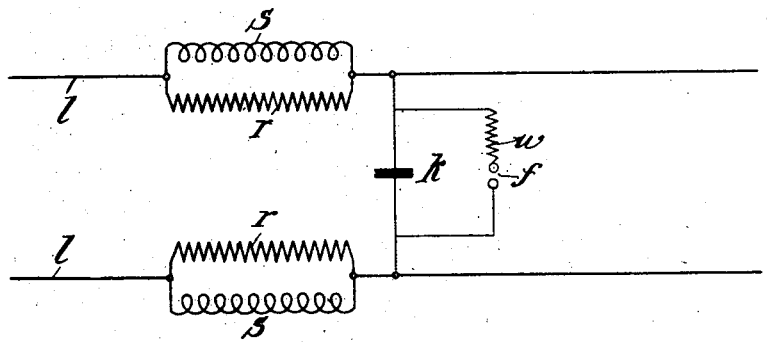
Figure 2:
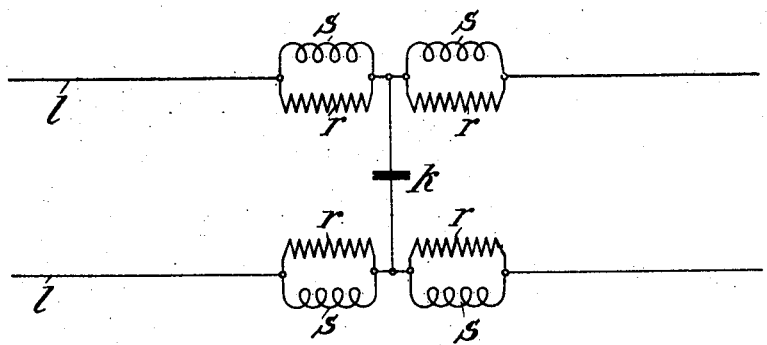
Figure 3:
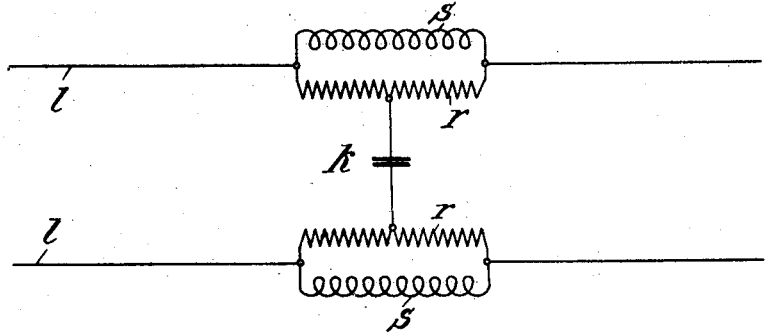

Figure 1 shows an arrangement with inductances in series with the conductors of a line and resistances in shunt to each of said inductances, and a capacity inserted between said conductors, Fig. 2 a duplication of the arrangement of the inductances and resistances of Fig. 1, and Fig. 3 a modification of the arrangement shown in Fig. 1.

It is well known that electrical apparatus and machinery which are connected to transmission lines or cables of some length may be protected from the admission of abnormal voltage waves by inserting a choke coil into the line. Each voltage or current wave traveling along the line and representing a rapidly moving excessive or reduced voltage and compared with the normal working voltage is intended to be reflected by such a protective choke coil and to be sent back onto the line. In reality this protective device is limited in its action since, on the one hand, its concentrated self-induction cannot be made as high as desired, and on the other hand, in case of very rapid disturbances, e. g. sudden rises in voltage which occur when switching lines and apparatus into circuit, the entire self-induction of the protective choke coil does not come into play but only a portion thereof which may fall as low as the leakage induction between two adjacent turns.

Another known protective device consists of a concentrated capacity which is connected shortly in front of the machine or another apparatus to be protected, between the conductors or between line and ground. In this arrangement any disturbing wave is also reflected at the terminals of the condenser, so that only a small portion of the disturbance, depending on the size of the condenser, can enter the machine. Perfect protection of the winding of the machine is, however, not afforded by this system.

The protective choke coil and the protective condenser have the common drawback that, although it is true that without appreciably influencing the low-frequency working current they to a certain extent keep away from the machine all disturbances in voltage lasting a very short time, they nevertheless reflect this energy of the disturbing wave back onto the line without weakening it. The disturbing waves being thus continually reflected therefore travel to and fro on the line until they are finally dissipated owing to the very low resistance of the line. Each reflection by a device for keeping back these waves is, as already stated, not perfect, but such a device allows a portion of the disturbance to pass on, whereby the windings of the electrical machine are continually abnormally strained until the disturbing wave is completely dissipated.

In order to annihilate the energy of the disturbing wave it has heretofore been proposed to employ a concentrated inductance having a resistance in shunt thereto, this combination being inserted into the line. This arrangement also has no material influence upon the low periodicity working current, because this current can flow through the inductance having a very small resistance for low frequency. In order to be able with this last described protective device to absorb the energy of the disturbing wave as effectively as possible the ohmic resistance in parallel with the inductance must be given a value of half the line characteristic, which may be proven theoretically and experimentally. In this case the characteristic is the square root of the quotient of self-induction and capacity per unit length of the lines. Half the energy is then converted into Joule's heat, one quarter of the energy of the incoming wave is reflected, and the last quarter travels past the protective device into the second section of the line. It will therefore be readily understood from the above that these arrangements do not afford effective protection against powerful disturbing waves, since both the reflected disturbing wave as well as that which passes through have half the current and voltage amplitudes of the original wave. In order that the wave which passes through to machinery or apparatus may be smaller, the value of the ohmic resistance must be considerably changed, but thereby the advantage of rapid absorption of energy would be lost, the effect in this case again approaching that of a simple protective choke coil which is inserted between the conductors.

A primary object of my invention is to obviate the above defects, and to provide protective means which will perfectly absorb the incoming disturbing wave and convert its energy into Joule's heat. The incoming wave can then neither be reflected nor pass through the protective means to the line beyond. For providing an arrangement of this kind it is not sufficient to employ only inductance and resistance in parallel therewith, but it is necessary that the three elements: concentrated self-induction, concentrated capacity, and an ohmic resistance adjusted to the characteristic of the line be simultaneously connected at adjacent points on the line.

It is obvious that the protective device must comprise ohmic resistance for annihilating the energy of abnormal waves of any form. Accordingly, the term ohmic resistance as used in this specification is to be understood as including any device in which energy is dissipated or converted into another form of energy. That self-induction and capacity must be conjointly employed can be explained by the fact that a concentrated inductance reflects any incoming rapid voltage wave substantially with the same sign, but that a concentrated capacity sends back the voltage wave onto the line substantially with a reversed sign. If it is desired to effect the extinction of the reflected wave, this can therefore be brought about only by the conjoint action of self-induction and capacity, whose individual reflected waves neutralize each another. When by suitably proportioning the resistance provision is made for complete absorption of the incoming disturbing waves, the protective device will allow no energy to pass through it. Theoretically it follows that in this ideal case the ohmic resistance must be about equal to the characteristic of the loop of line to be protected almost independently of the particular construction of the protective device.

A very effective protective means according to my invention is shown in Fig. 1. In a line leading for instance to a machine to be protected are inserted concentrated inductances $s$, $s$ in each side $l$ of the line, while behind these a condenser $k$ is connected between the sides $l$, $l$. The resistances $r$, $r$ are connected in parallel to the inductances. The normal working current is not materially influenced by the protective apparatus, but flows through the inductances $s$, $s$ and passes by the capacity $k$. Any rapid disturbing wave arriving over a side $l$, however, cannot enter the inductances $s$, $s$, but will find a path through the resistance $r$. It is reflected at the condenser $k$ so that it must again pass through the resistance. If the value of the self-induction and capacity were infinite the energy of the disturbing wave would be completely annihilated in the resistance. Since, however, both values must be made definite, there will be slight divergencies from the ideal case, but as theory shows, it is possible to employ for each value of inductance and capacity such a value of the damping resistances $r$, that only an exceedingly small amount of the impinging wave is allowed to pass or is reflected. This protective device can be employed in the same way as in front of apparatus at the end of electric lines, or at any other desired places, e. g. where the aerial lines are connected to insulated cables. In order to annihilate wave trains from both ends of the line, it is preferable to duplicate the inductances and the resistance in shunt therewith. Such an arrangement is shown in Fig. 2. The resistances $r$, $r$ are of course preferably given different values if lines of different characteristics are connected together.

In Fig. 3 a similar arrangement is shown for absorbing waves which are likely to arrive from both ends, this arrangement differing from that of Fig. 1 in the inductances in the principal lines not being connected with the junction points of the condenser and the resistances, so that on the one hand less apparatus is required, and on the other hand the possibility present in the arrangement shown in Fig. 2 of the network being short circuited by the condenser in case of a puncture, is now avoided, because there is always some resistance in series.

In none of these protective devices free electric oscillations can occur, notwithstanding the simultaneous presence of condensers and inductances, because the damping resistance in itself is of such a value that any natural vibration is suppressed.

On long distance lines a number of such protective devices may, of course, be arranged, so that rapid disturbances of the equilibrium occurring in any one section of the line cannot pass the protected ends of this section, but are dissipated there. To obtain with certainty the complete absorption of the disturbing waves it may be preferable to connect several of the described protective devices in series in order to dissipate with certainty that remnant of the waves which passes through one protective device on account of the capacity and self-induction having definite values.

The resistances employed for annihilating the disturbing waves are preferably made of material of high specific resistance so that they may be of short length and may really operate as concentrated ohmic resistances. The terms concentrated self-induction and capacity as used herein include any artificial increase in the inductivity of the line or in the capacity. It is not absolutely necessary that special condensers and inductance coils be connected in circuit. An effective concentrated inductance can, for example, be produced by leading the current-carrying line through thin, concentric disks of sheet iron, in which a powerful self-induction field can form. These disks may have between them an air-gap in order to reduce the effect of varying permeability. Besides electrostatic and electrolytic condensers I may connect in the line, for example, short lengths of cable which have a considerably higher capacity than the line to be protected.

The above described protective device has the advantage not only of discharging its function, as most of the previous protective devices have done, when the rises of potential are considerably above the normal voltage of the system, but also of annihilating any minor disturbing waves.

When considerable rises in potential above the voltage of the system occur, the dielectric of the condensers is of course considerably strained. To protect it against puncture, spark-gaps are preferably connected in the well known manner in parallel with the condensers, which spark-gaps short circuit the condensers when they are very much overstrained and so, on the one hand, protect their dielectric, but on the other hand, because of the short circuit which acts as a condenser of infinite size, do not affect the action of the protective device for excess voltages. Such spark gap is shown for instance at $f$ in Fig. 1. If desired, other damping resistances $w$ may be connected in series with these protective spark-gaps as is also shown in Fig. 1. Electrolytic condensers provide in themselves favorable conditions for discharge and therefore, in general, need no special spark-gaps in parallel with them.

I claim:—

1. In an electric circuit the combination with a line constituting one side of the circuit, of a concentrated inductance, and a resistance in parallel inserted in the line, and a concentrated capacity connected between said line and the other side of the circuit.

2. In an electric circuit comprising the two sides of the line, the combination with said two sides, of a concentrated inductance, and a resistance in parallel inserted in one side of the line, and a concentrated capacity connected between the two said sides.

3. In an electric circuit comprising two sides of a line, the combination with said two sides, of a concentrated inductance and a resistance in parallel inserted in each side, and a concentrated capacity connected between points of said resistances located between the ends thereof.

In witness whereof I have hereunto set my signature in presence of two subscribing witnesses.

REINHOLD RÜDENBERG.

Witnesses:
  HENRY HASPER,
  WOLDEMAR HAUPT.